United States Patent
Ma et al.

(10) Patent No.: US 9,574,117 B2
(45) Date of Patent: Feb. 21, 2017

(54) LOW SURFACE ENERGY ADHESIVE

(71) Applicant: 3M INNOVATIVE PROPERTIES COMPANY, St. Paul, MN (US)

(72) Inventors: Jingjing Ma, Cottage Grove, MN (US); Zhong Chen, Woodbury, MN (US); Megan P. Lehmann, Stillwater, MN (US); Michael L. Tumey, St. Paul, MN (US); Dong-Wei Zhu, Shoreview, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 14/979,713

(22) Filed: Dec. 28, 2015

(65) Prior Publication Data

US 2016/0108295 A1    Apr. 21, 2016

Related U.S. Application Data

(63) Continuation of application No. 13/002,358, filed as application No. PCT/US2009/046841 on Jun. 10, 2009, now abandoned.
(Continued)

(51) Int. Cl.
*C09J 7/02* (2006.01)
*C09J 133/08* (2006.01)
(Continued)

(52) U.S. Cl.
CPC .............. *C09J 133/08* (2013.01); *B32B 7/12* (2013.01); *C08K 3/36* (2013.01); *C08K 5/01* (2013.01);
(Continued)

(58) Field of Classification Search
None
See application file for complete search history.

(56) References Cited

U.S. PATENT DOCUMENTS

| 4,243,500 A | 1/1981 | Glennon |
| 4,256,805 A | 3/1981 | Tugukuni et al. |

(Continued)

FOREIGN PATENT DOCUMENTS

| JP | 05-156223 | 6/1993 |
| JP | 7-102229 | 4/1995 |

(Continued)

OTHER PUBLICATIONS

ASTM Designation: D 3330/D 3330M-04, Standard Test Method for Peel Adhesion of Pressure-Sensitive Tape, pp. 1-6, 2009.
(Continued)

*Primary Examiner* — Frank D Ducheneaux
(74) *Attorney, Agent, or Firm* — Thomas M. Spielbauer; Dena Ehrich; Philip Y. Dahl (57) ABSTRACT

Adhesives suitable for use with low surface energy materials are described. The adhesive contain an acrylic copolymer, a high glass transition temperature tackifier and a low glass transition temperature tackifier. The acrylic copolymer is the reaction product of a first alkyl(meth)acrylate having at least 5 carbon atoms in the alkyl group, a second alkyl(meth) acrylate having 1 to 4 carbon atoms in the alkyl group, and a vinyl carboxylic acid. Both tackifiers have a Tg greater than the Tg of the acrylic copolymer. The high glass transition temperature tackifier has a Tg of at least 20° C. and the low glass transition temperature tackifier has a Tg of less than 0° C.

14 Claims, 1 Drawing Sheet

Related U.S. Application Data (60) Provisional application No. 61/077,745, filed on Jul. 2, 2008.

(51) Int. Cl.
| | |
|---|---|
| *C09J 133/02* | (2006.01) |
| *C09J 193/04* | (2006.01) |
| *C08K 3/36* | (2006.01) |
| *B32B 7/12* | (2006.01) |
| *C08K 5/01* | (2006.01) |
| *C09J 165/02* | (2006.01) |

(52) U.S. Cl.
CPC ............ *C09J 7/0217* (2013.01); *C09J 133/02* (2013.01); *C09J 165/02* (2013.01); *C09J 193/04* (2013.01); *B32B 2255/26* (2013.01); *B32B 2405/00* (2013.01); *Y10T 428/2891* (2015.01); *Y10T 428/31935* (2015.04)

(56) References Cited

U.S. PATENT DOCUMENTS

| | | | |
|---|---|---|---|
| 4,731,273 A * | 3/1988 | Bonk | B29C 61/10 |
| | | | 428/34.9 |
| 4,988,742 A | 1/1991 | Moon et al. | |
| 5,028,484 A | 7/1991 | Martin et al. | |
| 5,284,891 A | 2/1994 | Wouters et al. | |
| 5,602,221 A | 2/1997 | Bennett et al. | |
| 5,683,798 A | 11/1997 | Bennett et al. | |
| 5,708,110 A | 1/1998 | Bennett et al. | |
| 5,756,584 A | 5/1998 | Bennett et al. | |
| 5,814,685 A | 9/1998 | Satake et al. | |
| 5,874,743 A | 2/1999 | Vuylsteke et al. | |
| 5,883,149 A | 3/1999 | Bennett et al. | |
| 5,905,099 A | 5/1999 | Everaerts et al. | |
| 7,056,413 B2 | 6/2006 | Caspari et al. | |
| 7,070,051 B2 | 7/2006 | Kanner et al. | |
| 2003/0008140 A1 | 1/2003 | Takizawa | |
| 2003/0082373 A1 | 5/2003 | Silverberg et al. | |
| 2003/0096075 A1 | 5/2003 | Dollase et al. | |
| 2004/0219193 A1 | 11/2004 | Abe et al. | |
| 2005/0061435 A1 | 3/2005 | Everaerts et al. | |
| 2006/0099413 A1 | 5/2006 | Lu | |
| 2006/0134362 A1* | 6/2006 | Lu | C09J 7/0217 |
| | | | 428/40.1 |
| 2006/0154097 A1 | 7/2006 | Amano et al. | |
| 2006/0182958 A1 | 8/2006 | Okochi et al. | |
| 2006/0193900 A1 | 8/2006 | Yasukochi et al. | |
| 2007/0218276 A1* | 9/2007 | Hiramatsu | C09J 7/0217 |
| | | | 428/354 |

FOREIGN PATENT DOCUMENTS

| | | |
|---|---|---|
| JP | 09-302322 | 11/1997 |
| JP | 10-183092 | 7/1998 |
| JP | 2004-203920 | 7/2004 |
| JP | 2008-007693 | 1/2008 |
| WO | WO 2007/002557 | 3/2007 |
| WO | WO 2008/070386 | 6/2008 |

OTHER PUBLICATIONS

International Search Report Form PCT/ISA/210 from International Application No. PCT/US2009/046841, dated Sep. 16, 2009.
"Technology of Pressure-Sensitive Adhesives and Products," Benedek et al., CRC Press, 2009, pp. 3.23.
Aldrich Data Sheet.

* cited by examiner

LOW SURFACE ENERGY ADHESIVE

FIELD

The present disclosure relates to acrylic adhesives, particularly adhesives suitable for bonding to low surface energy substrates. Generally, the adhesives include both a high glass transition temperature tackifier and a low glass transition temperature tackifier.

SUMMARY

Briefly, in one aspect, the present disclosure provides an adhesive comprising an acrylic copolymer, a high Tg tackifier having a glass transition temperature of at least 20° C.; and a low Tg tackifier having a glass transition temperature of no greater than 0° C., wherein the glass transition temperatures of the high Tg tackifier and the low Tg tackifier are greater than the glass transition temperature of the acrylic copolymer. The acrylic copolymer comprises the reaction product of a first alkyl (meth)acrylate, wherein the alkyl group of the first alkyl (meth)acrylate comprises at least 5 carbon atoms; a second alkyl(meth)acrylate, wherein the alkyl group of the second alkyl (meth)acrylate comprises 1 to 4 carbon atoms; and a vinyl carboxylic acid; and In some embodiments, the alkyl group of the first alkyl (meth)acrylate comprises 8 carbon atoms. In some embodiments, the alkyl group of the second alkyl(meth)acrylate comprises 1 or 2 carbon atoms. In some embodiments, the alkyl group of the second alkyl(meth)acrylate comprises 4 carbon atoms.

In some embodiments, the weight ratio of the first alkyl (meth)acrylate to the second alkyl (meth)acrylate is between 0.7:1 and 1:0.7 e.g., between 0.8:1 and 1:0.8, e.g., between 0.9:1 and 1:0.9. In other embodiments, the weight ratio of the first alkyl (meth)acrylate to the second alkyl (meth) acrylate is at least 2:1, e.g., at least 3:1. In still other embodiments, the weight ratio of the second alkyl (meth) acrylate to the first alkyl (meth)acrylate is at least 2:1, e.g., at least 3:1.

In some embodiments, the vinyl carboxylic acid is selected from the group consisting of acrylic acid, methacrylic acid, itaconic acid, maleic acid, fumaric acid, and β-carboxyethylacrylate. In some embodiments, the acrylic copolymer comprises at least 3% by weight, e.g., at least 4% by weight of the vinyl carboxylic acid. In some embodiments, the acrylic copolymer comprises no greater than 10% by weight, e.g., no greater than 8% by weight, e.g., no greater than 5% by weight of the vinyl carboxylic acid. In some embodiments, the acrylic copolymer comprises between 4 and 5% by weight of vinyl carboxylic acid, inclusive.

In some embodiments, the adhesive comprises 40 to 60% by weight total tackifier content based on the total weight of the acrylic copolymer, the high Tg tackifier and the low Tg tackifier. In some embodiments, the adhesive comprises 50 to 55% by weight total tackifier content based on the total weight of the acrylic copolymer, the high Tg tackifier and the low Tg tackifier.

In some embodiments, the adhesive comprises 35 to 45% by weight, e.g., 41 to 43% by weight, of the high Tg tackifier based on the total weight of the acrylic copolymer, the high Tg tackifier and the low Tg tackifier. In some embodiments, the high Tg tackifier is selected from the group consisting of terpene phenolic resins, terpenes, rosin esters, aliphatic-modified C5 to C9 hydrocarbons, and aromatic-modified C5 to C9 hydrocarbons. In some embodiments, the high Tg tackifier has a weight average molecular weight of 500 to 1500 gm/mole, e.g., 500 to 1000 gm/mole, e.g., 500 to 800 gm/mole.

In some embodiments, the adhesive comprises 2 to 13% by weight, e.g., 4 to 6% by weight of the low Tg tackifier based on the total weight of the acrylic copolymer, the high Tg tackifier and the low Tg tackifier. In some embodiments, the low Tg tackifier is selected from the group consisting of terpenes, rosin esters, aliphatic-modified C5 to C9 hydrocarbons, and aromatic-modified C5 to C9 hydrocarbons. In some embodiments, the low Tg tackifier has a weight average molecular weight of 300 to 1000 gm/mole, e.g., 300 to 800 gm/mole, e.g., 300 to 500 gm/mole.

In some embodiments, the adhesive further comprises a crosslinker, e.g., covalent crosslinker(s) and/or ionic crosslinking agent(s). In some embodiments, the adhesive also comprises at least one additional component selected from the group consisting of fillers, dyes, pigments, antioxidants, UV-stabilizers, fumed silica, nanoparticles, and surface-modified nanoparticles.

In some embodiments, the glass transition temperature of the adhesive is less than 252 K, as measured by differential scanning calorimetry.

In another aspect, the present disclosure provides an adhesive article comprising a first substrate and an adhesive according to the present disclosure bonded to the substrate. In some embodiments, the substrate is a low surface energy substrate having a surface energy of no greater than 35 millinewtons per meter.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Generally, adhesives, e.g., pressure sensitive adhesives, including acrylic adhesives are well-known. The use of tackifiers and plasticizers to modify the performance of adhesives is also known. However, although individual components of an adhesive formula may be known, the selection of a specific combination of components and their relative amounts in order to achieve specific, desired end-use requirements remains a significant challenge.

Adhesion to low surface energy materials is one example of a long-felt need in the art of adhesive formulation. While there are adhesives that provide acceptable levels of performance, there is on ongoing need for more options to meet this key requirement.

The present inventors have discovered that by selecting both specific kinds and ratios of monomers in the formation of an acrylic copolymer, and combining such copolymers with both a high glass transition temperature and a low glass transition temperature tackifier, acrylic adhesives with a relatively high acid content can be formulated to provide excellent adhesion to low surface energy surfaces. This surprising result is contrary to conventional thinking in the art of adhesive formulation, where it has been believed that low acid content is critical to obtaining good adhesion to low surface energy substrates.

Generally, the adhesives of the present disclosure comprise an acrylic copolymer, at least one high glass transition temperature tackifier and at least one low glass transition temperature tackifier. In some embodiments, the adhesive also includes a crosslinking agent. Optionally, other components typical of adhesive formulations may also be present such as fillers, dyes, pigments, antioxidants, UV-stabilizers and the like.

Generally, the acrylic copolymer comprises the reaction product of a mixture of a first alkyl (meth)acrylate, a second alkyl(meth)acrylate, and a vinyl carboxylic acid. As used herein, "(meth)acrylate" refers to an acrylate and/or methacrylate. For example, butyl (meth)acrylate refers to butyl acrylate and/or butyl methacrylate. In some embodiments, the mixture may also include a crosslinking agent.

The alkyl group of the first alkyl (meth)acrylate contains at least 5 carbon atoms. In some embodiments, this alkyl group contains no greater than 8 carbon atoms. In some embodiments, the alkyl group of the first alkyl (meth) acrylate has eight carbon atoms, e.g., isooctyl (meth)acrylate and/or 2-ethylhexyl (meth)acrylate.

The alkyl group of the second alkyl (meth)acrylate contains no greater than 4 carbon atoms. In some embodiments, the acrylic polymer includes at least one alkyl (meth) acrylate having an alkyl group of 4 carbon atoms, e.g., butyl (meth)acrylate. In some embodiments, the alkyl group of at least one alkyl (meth)acrylate contains 1-2 carbon atoms, e.g., methyl acrylate and/or ethyl acrylate.

Exemplary vinyl carboxylic acids that may be useful in some embodiments of the present disclosure include acrylic acid, methacrylic acid, itaconic acid, maleic acid, fumaric acid, and β-carboxyethylacrylate. Generally, the acrylic copolymers of the present disclosure comprise at least 3% by weight, in some embodiments, at least 4% by weight of the vinyl carboxylic acid based on the total weight of the alkyl (meth)acrylates and the vinyl carboxylic acids. In some embodiments, the acrylic polymer comprises no greater than 10% by weight, in some embodiments, no greater than 8% by weight, and, in some embodiments, no greater than 5% by weight of the vinyl carboxylic acid. In some embodiments, the acrylic polymer comprises 4-5% by weight of vinyl carboxylic acid based on the total weight of the alkyl (meth)acrylates and the vinyl carboxylic acids.

Generally, tackifiers useful in the adhesive compositions of the present disclosure are materials that are compatible with the acrylic copolymer to which they are added and have a glass transition temperature (Tg) greater than the Tg of the acrylic copolymer. In contrast, a plasticizer is compatible with the acrylic copolymer but has a Tg less than the Tg of the acrylic copolymer. Although the actual Tg varies depending on the formulation of the acrylic copolymer, the Tg of acrylic copolymers typically less than −20° C., e.g., less than −30° C., less than −40° C., or even less than −50° C.

The adhesives of the present disclosure include at least two tackifiers, a high Tg tackifier and a low Tg tackifier. The high Tg tackifier has a Tg of at least 20° C. and is typically a solid at room temperature. Exemplary high Tg tackifiers include terpenes, aliphatic- or aromatic-modified C5 to C9 hydrocarbons, and rosin esters. In some embodiments, lower molecular weight hydrocarbons may be preferred, as compatibility with the acrylic copolymer decreases as the molecular weight of the hydrocarbon increases. In some embodiments, the weight average molecular weight (Mw) of the high Tg tackifier is between 500 and 2000 gm/mole. In some embodiments, the Mw of the high Tg tackifier is no greater than 1500, in some embodiments, in some embodiments, no greater than 1000, or even no greater than 800 gm/mole.

The low Tg tackifier has a glass transition temperature of no greater than 0° C., in some embodiments, no greater than −10° C., or even no greater than −20° C. Such materials are generally liquids at room temperature. There is no particular lower limit on the glass transition temperature of the low Tg tackifier, except that it must be greater than the Tg the acrylic copolymer. In some embodiments, the Tg of the low Tg tackifier is at least 10° C. greater, at least 20° C. greater, or even at least 30° C. greater than the Tg of the acrylic copolymer. Generally, lower molecular weight compounds may be preferred, as compatibility with the acrylic copolymer decreases as the molecular weight of the increases. Exemplary low Tg tackifiers include terpene phenolic resins, terpenes, aliphatic- or aromatic-modified C5 to C9 hydrocarbons, and rosin esters. In some embodiments, the weight average molecular weight (Mw) of the low Tg tackifier is between 300 and 1500 gm/mole. In some embodiments, the Mw of the low Tg tackifier is no greater than 1000, in some embodiments, no greater than 800, or even no greater than 500 gm/mole.

Typically, acrylic copolymer-based adhesives require little or no tackifiers to achieve desired pressure-sensitive adhesive properties. In contrast, the adhesives of the present disclosure generally comprise 40 to 60% by weight (wt. %) total tackifier content, based on the total weight of all tackifiers divided by the total weight of the acrylic copolymer and all tackifiers. In some embodiments, the adhesives comprise at least 45 wt. %, and, in some embodiments, at least 50 wt. % total tackifier content. In some embodiments, the adhesives comprise no greater than 55 wt. % total tackifier content.

In some embodiments, the adhesives comprise 35 to 45 wt. % of the high Tg tackifier. In some embodiments, the adhesives comprise at least 40 wt. % of the high Tg tackifier. In some embodiments, the adhesives comprise no greater than 44 wt. % of the high Tg tackifier. In some embodiments, the adhesives comprise 41 to 43 wt % of the high Tg tackifier.

In some embodiments, the adhesives comprise 2 to 13 wt. % of the low Tg tackifier. In some embodiments, the adhesives comprise no greater than 10 wt. %, e.g., no greater than 7 wt. % of the low Tg tackifier. In some embodiments, the adhesives comprise at least 3 wt. %, and, in some embodiments, at least 4 wt. % of the low Tg tackifier. In some embodiments, the adhesives comprise 3 to 7 wt. % (4 to 6 wt. %) of the low Tg tackifier.

In some embodiments, the adhesives of the present disclosure comprise 35 to 45 wt. % of the high Tg tackifier and 2 to 13 wt. % of the low Tg tackifier. In some embodiments, the adhesives comprise 40 to 44 wt. % (e.g., 41 to 43 wt. %) of the high Tg tackifier and 3 to 7 wt. % (e.g., 4 to 6 wt. %) of the low Tg tackifier.

Generally, the relative amounts of the first alkyl (meth) acrylate and the second alkyl (meth)acrylate can be varied depending on the specific monomers chosen and the desired properties. In some embodiments, the weight ratio of the first alkyl (meth)acrylate to the second alkyl (meth)acrylate is between 4:1 and 1:4, e.g., between 3:1 and 1:3. In some embodiments, the weight ratio of the first alkyl (meth) acrylate to the second alkyl (meth)acrylate is about 1:1. For example, in some embodiments, the ratio is between 0.7:1 and 1:0.7, e.g., between 0.8:1 and 1:0.8, or even between 0.9:1 and 1:0.9. In other embodiments the ratio of the first alkyl (meth)acrylate to the second alkyl (meth)acrylate is at least 2:1, in some embodiments, at least 2.5:1, or even at least 3:1. In some embodiments, the ratio of the first alkyl (meth)acrylate to the second alkyl (meth)acrylate is between 2:1 and 3:1, inclusive. In still other embodiments, the ratio of the second alkyl (meth)acrylate to the first alkyl (meth) acrylate is at least 2:1, in some embodiments, at least 2.5:1, or even at least 3:1. In some embodiments, the ratio of the second alkyl (meth)acrylate to the first alkyl (meth)acrylate is between 2:1 and 3:1, inclusive.

In some embodiments, the adhesives of the present disclosure may contain a crosslinking agent. Generally, any suitable crosslinking agent may be used. Exemplary crosslinking agents include covalent crosslinkers such as bis-amides, epoxies, and melamines; and ionic crosslinking agents such as multi-functional amines, metal oxides, and organo-metallic chelating agents (e.g., aluminum acetylacetonate). The amount of crosslinking agent included depends on well-understood factors such as the desired degree of crosslinking and the relative effectiveness of the crosslinking agent in the particular system. For example, in some embodiments, adhesives of the present disclosure comprise 0.05 to 0.15 wt. % (e.g., 0.08 to 0.14 wt. %) of a bisamide crosslinker based on the weight of the acrylic copolymer. In some embodiments, adhesives of the present disclosure comprise 0.2 to 0.8 wt. % (e.g., 0.2 to 0.5 wt. %) of aluminum acetylacetonate crosslinker based on the weight of the acrylic copolymer.

The adhesives of the present disclosure may contain other common components known for use in adhesives such as dyes, pigments, UV-stabilizers, fillers and the like. Exemplary fillers include calcium carbonate, carbon black, and fumed silica. In some embodiments, nanoparticles, e.g., silica nanoparticles may be included. In some embodiments, surface-modified nanoparticles may be included.

Generally, the glass transition temperature of a mixture of, e.g., an acrylic copolymer and one or more tackifiers and/or plasticizers can be calculated using the Fox Equation, i.e.: $1/Tg=\Sigma Wi/Tgi$. In this equation, Tg is the glass transition temperature of the mixture, Wi is the weight fraction of component i in the mixture, and Tgi is the glass transition temperature of component i, and all glass transition temperatures are in Kelvin (K). Alternatively, the glass transition temperature can be measured in a variety of known ways, including, e.g., through differential scanning calorimetry (DSC).

In some embodiments, the addition of the high Tg tackifier and the low Tg tackifier to the acrylic copolymer is sufficient to raise the glass transition temperature of the resulting adhesive to no greater than 252 K, as measured by DSC. In some embodiments, the glass transition temperature is no greater than 260 K, as calculated using the Fox Equation.

EXAMPLES

General procedure for the preparation of the acrylic copolymer of acrylic copolymer (AC-1). To a bottle were added 48.0 grams of 2-ethyl hexyl acrylate (2-EHA, obtained from Dow Chemical Co.), 4.5 grams of butyl acrylate (BA), and 4.5 grams of acrylic acid (AA, obtained from BASF Corp.) The bottle also contained 177 grams of ethyl acetate (EtOAc, a solvent) and 0.200 grams of VAZO-67 (an azonitrile polymerization initiator obtained from DuPont). This mixture was purged with nitrogen to remove all oxygen and the bottle was then sealed. This sealed bottle was placed in a water bath and heated at 58° C. for 24 hours. The resulting sample was further diluted with an additional 56 grams of EtOAc. The final sample was a clear, viscous solution. The percent solids (determined by drying the sample at 105° C. for 3 hours) and the intrinsic viscosity (IV, 0.25 g/dL in EtOAc) were measured and results are summarized in Table 1.

Acrylic copolymers AC-2 to AC-6 were made in similar process by varying monomer concentrations, by adding toluene (Tol) as polymerization solvent in addition to ethyl acetate, and adjusting the polymerization temperature, as summarized in Table 1.

TABLE 1

Description of acrylic copolymers AC-1 to AC-6.

| Sample | 2-EHA/BA/AA | Solvents (wt. ratio) | Temp. | % Solids | I.V., g/dL |
|---|---|---|---|---|---|
| AC-1 | 48/47.5/4.5 | EtOAc | 58° C. | 29.1 | 1.40 |
| AC-2 | 48/47.5/4.5 | EtOAc | 58° C. | 29.1 | 1.47 |
| AC-3 | 48/47.5/4.5 | EtOAc/Tol (50/50) | 60° C. | 39.1 | 0.76 |
| AC-4 | 48/47.5/4.5 | EtOAc/Tol (75/25) | 60° C. | 43.2 | 1.13 |
| AC-5 | 49/48/3 | EtOAc | 60° C. | 28.6 | 1.43 |
| AC-6 | 25/69/6 | EtOAc/Tol (60/40) | 60° C. | 39.4 | 0.83 |

Adhesive compounding and sample preparation.

Materials used to prepare the following adhesive samples are summarized in Table 2; wherein Tg is the glass transition temperature, Tsoft is the softening temperature, Mw is the weight-average molecular weight, and Mn is the number-average molecular weight.

TABLE 2

Materials used to prepare adhesives.

| Material | Description | Tg ° C. | Tsoft ° C. | Mol. Wt (Daltons) Mw | Mn | Source |
|---|---|---|---|---|---|---|
| FORAL 85LB | High Tg tackifier | 42 | 80-88 | — | — | Hercules Inc. |
| SP-553 | High Tg tackifier | 73 | 110-120 | — | — | Schenectady International |
| ESCOREZ 2520 | Low Tg tackifier | −22 | 20-25 | 450 | 320 | ExxonMobil Chemical |
| STAYBELITE Ester 3-E | Low Tg tackifier | −18 | 20-25 | — | — | Eastman Chemical |
| SYLVAREZ TR A-25 | Low Tg tackifier | −20 | 22-28 | 450 | 330 | Arizona Chemical |
| GLISSOPAL 1000 (G1000) | Plasticizer | −60 | NA | 1000 | 1600 | Exxon Mobil Chemical |
| PYCAL 94 | Plasticizer | −65 | NA | 270 | 270 | Uniquema |

The detailed adhesive compositions for Comparative Examples CE-1 to CE-4, and Examples 1 to 26 are listed in Table 3. All ingredients except the bisamide crosslinker were added to a glass jar. Toluene was added to make solution of 37% to 40% solids. The jar was put on a roller overnight for mixing. Bisamide crosslinker was added into the jar right before coating.

The adhesive solution was coated on a 51 micron (2 mil) polyester film backing (HOSTAPHAN 3SAB available from Mitsubishi Polyester Film, Inc., Greer, S.C.) using a 15 cm (6 inch) wide knife coater. The coater gap was set to give a 51 micron (2.0 mil) thick adhesive layer after drying. The sample was dried in an oven at 71° C. (160° F.) for 10 to 15 minutes. The dried sample was covered with a release liner and stored in controlled environment (temperature and humidity) room before testing.

Samples were cut to size and tested according to the following test methods.

90 Degree Peel Adhesion. Peel adhesion testing was performed as described in the ASTM International standard, D3330, Method F, with a 1.3 cm×20 cm (½ in.×8 in.) test specimen using an IMASS SP-200 slip/peel tester (available from IMASS, Inc., Accord, Mass.). The test panels included stainless steel (SS, 304, 18 gauge stainless steel, bright annealed finish, available from ChemInstruments, Inc., Fairfield, Ohio), polypropylene (PP, natural polypropylene panels available from QUADRANT Engineering Plastics Products USA, Inc., Reading, Pa.), high density polyethylene (HDPE, PROTEUS natural high density polyethylene available from QUADRANT Engineering Plastics Products USA, Inc., Reading, Pa.), polymethyl methacrylate (PMMA, PLEXIGLAS MCM clear panels available from Altuglas International, Philadelphia, Pa.), polycarbonate (PC, LEXAN, clear panels available from SABIC Innovative Plastics, Pittsfield, Mass.), and acrylonitrile-butadiene-styrene (ABS, general purpose, hair-cell finish panels available from Spartech Plastics, Clayton, Mo.). The peel tests were performed after a 15 minute dwell time on the test panel, unless otherwise stated. The average peel adhesion force required to remove the tape from the panel was measured in ounces and is expressed in Newtons/decimeter (N/dm).

180 Degree Peel Adhesion. Peel adhesion testing was performed as described in the ASTM International standard, D3330, Method A, with a 1.3 cm×20 cm (½ in.×8 in.) test specimen using an IMASS SP-200 slip/peel tester available from IMASS, Inc., Accord, Mass. The test panels were polypropylene (PP, natural polypropylene panels available from QUADRANT Engineering Plastics Products USA, Inc., Reading, Pa.). The peel tests were performed after a 15 minute dwell time on the test panel, unless otherwise stated. The average peel adhesion force required to remove the tape from the panel was measured in ounces and is expressed in Newtons/decimeter (N/dm).

Static Shear at 70° C. Static shear holding power testing was performed as described in the ASTM International standard, D3654, Procedure A, with a 1.3 cm×2.5 cm (½ in.×1 in.) test specimen and a 500 g load using an oven at 70° C. (158° F.). The test panels were stainless steel (SS, 304, 18 gauge stainless steel, bright annealed finish, available from ChemInstruments, Inc., Fairfield, Ohio). Time to failure in minutes was recorded. If no failure was observed after 10,000 minutes, the test was stopped and a value of 10,000+ minutes was recorded.

All samples showed excellent shear at 70° C. using a stainless steel panel. The shear test for each sample was terminated after 10,000 minutes as no failure occurred. As summarized in Table 3, Comparative Examples CE-1 to CE-4 comprise only an acrylic copolymer and one or more high Tg tackifiers. Although these adhesives show good adhesion to a high surface energy stainless steel panel, they generally had poor adhesion to polypropylene, a low surface energy (LSE) substrate. In contrast, the adhesive compositions of Examples 1 to 22, which comprise both at least one high Tg tackifier and at least one low Tg tackifier, generally provided significantly improved adhesion to the low surface energy polypropylene panel while maintaining good adhesion to the high surface energy stainless steel panel.

TABLE 3

Adhesive descriptions and test results.

| | Acrylic copolymer | | | Tackifiers (wt. %) | | | | 90° peel | |
| | | | | High Tg | | Low Tg | | | |
| | Copoly. | wt. % | wt. % | SP- | FORAL | SYL. | Bisamide | (N/dm) | |
| Ex. | I.D. | in adh. | AA | 553 | 85LB | A-25 | wt. % | SS | PP |
|---|---|---|---|---|---|---|---|---|---|
| CE-1 | AC-4 | 63.4 | 4.5 | 27.0 | 9.6 | 0.0 | 0.15 | 84 | 14 |
| CE-2 | AC-4 | 60.0 | 4.5 | 37.2 | 2.8 | 0.0 | 0.1 | 112 | 10 |
| CE-3 | AC-4 | 60.0 | 4.5 | 37.2 | 2.8 | 0.0 | 0.2 | 83 | 7 |
| CE-4 | AC-1 | 50.0 | 4.5 | 0.0 | 50.0 | 0.0 | 0.15 | 129 | 38 |
| 1 | AC-4 | 50.0 | 4.5 | 0.0 | 48.2 | 1.8 | 0.2 | 109 | 42 |
| 2 | AC-4 | 50.0 | 4.5 | 0.0 | 48.2 | 1.8 | 0.1 | 129 | 50 |
| 3 | AC-4 | 50.0 | 4.5 | 0.0 | 28.0 | 22.0 | 0.1 | 95 | 67 |
| 4 | AC-4 | 60.0 | 4.5 | 0.0 | 34.8 | 5.2 | 0.1 | 93 | 62 |
| 5 | AC-4 | 50.0 | 4.5 | 0.0 | 28.0 | 22.0 | 0.2 | 69 | 62 |
| 6 | AC-4 | 60.0 | 4.5 | 0.0 | 34.8 | 5.2 | 0.2 | 62 | 38 |
| 7 | AC-4 | 46.6 | 4.5 | 0.0 | 35.9 | 17.5 | 0.15 | 91 | 83 |
| 8 | AC-4 | 55.0 | 4.5 | 0.0 | 24.0 | 21.0 | 0.15 | 56 | 58 |
| 9 | AC-4 | 55.0 | 4.5 | 0.0 | 41.6 | 3.4 | 0.07 | 105 | 112 |
| 10 | AC-4 | 55.0 | 4.5 | 0.0 | 41.6 | 3.4 | 0.23 | 72 | 69 |
| 11 | AC-4 | 55.0 | 4.5 | 0.0 | 41.6 | 3.4 | 0.15 | 92 | 92 |
| 12 | AC-4 | 55.0 | 4.5 | 0.0 | 41.6 | 3.4 | 0.15 | 90 | 83 |
| 13 | AC-4 | 55.0 | 4.5 | 0.0 | 41.6 | 3.4 | 0.15 | 100 | 80 |
| 14 | AC-4 | 55.0 | 4.5 | 0.0 | 41.6 | 3.4 | 0.15 | 96 | 68 |
| 15 | AC-4 | 55.0 | 4.5 | 0.0 | 41.6 | 3.4 | 0.15 | 81 | 45 |
| 16 | AC-1 | 55.0 | 4.5 | 0.0 | 41.6 | 3.4 | 0.15 | 89 | 51 |
| 17 | AC-3 | 55.0 | 4.5 | 29.3 | 0.0 | 15.7 | 0.1 | 123 | 57 |
| 18 | AC-3 | 55.0 | 4.5 | 0.0 | 41.5 | 3.5 | 0.1 | 111 | 89 |
| 19 | AC-2 | 55.0 | 4.5 | 0.0 | 41.5 | 3.5 | 0.1 | 102 | 84 |

TABLE 3-continued

Adhesive descriptions and test results.

| | Acrylic copolymer | | | Tackifiers (wt. %) | | | 90° peel (N/dm) | |
| | | | | High Tg | Low Tg | | | |
| Ex. | Copoly. I.D. | wt. % in adh. | wt. % AA | SP-553 | FORAL 85LB | SYL. A-25 | Bisamide wt. % | SS | PP |
|---|---|---|---|---|---|---|---|---|---|
| 20 | AC-6 | 55.0 | 6.0 | 15.2 | 20.0 | 9.8 | 0.1 | 133 | 53 |
| 21 | AC-5 | 47.0 | 3.0 | 0.0 | 47.0 | 6.0 | 0.08 | 107 | 103 |
| 22 | AC-5 | 55.0 | 3.0 | 0.0 | 41.0 | 4.0 | 0.08 | 91 | 68 |

In addition, as shown in Table 4, Examples 17 to 20 provided good adhesion to a high density polyethylene (HDPE) panel, a very difficult to adhere to, low surface energy substrate.

TABLE 4

Adhesion of Examples 17 to 20 to a HDPE panel.

| | | Weight percent | | | | | (N/dm) |
| Ex. | Copolymer I.D. | Acrylic Copolymer | SP-553 | FORAL 85LB | SYL. A-25 | Bisamide | 90° peel HDPE |
|---|---|---|---|---|---|---|---|
| 17 | AC-3 | 55.0 | 29.3 | 0.0 | 15.7 | 0.1 | 57 |
| 18 | AC-3 | 55.0 | 0.0 | 41.5 | 3.5 | 0.1 | 61 |
| 19 | AC-2 | 55.0 | 0.0 | 41.5 | 3.5 | 0.1 | 58 |
| 20 | AC-6 | 55.0 | 15.2 | 20.0 | 9.8 | 0.1 | 51 |

Additional compositions based on adhesive copolymer AC-4 and the associated test results are summarized in Table 5. The adhesive samples were prepared as described above. All samples showed excellent shear at 70° C. using a stainless steel panel. The shear test for each sample was terminated after 10,000 minutes with no failure.

TABLE 5

Effects of varying the total amount of tackifiers and the amount of crosslinker.

| | Acrylic copolymer | | Tackifiers wt. %) | | | 90° peel (N/dm) | | |
| | | | High Tg | Low Tg | | | | |
| Ex. | I.D. | wt. % in adh. | wt. % AA | FORAL 85LB | ESTER 3-E | wt. % bisamide | SS | PP | HDPE |
|---|---|---|---|---|---|---|---|---|---|
| 23 | AC-4 | 50.0 | 4.5 | 45.0 | 5.0 | 0.15 | 104 | 97 | 51 |
| 24 | AC-4 | 55.0 | 4.5 | 41.5 | 3.5 | 0.10 | 97 | 100 | 65 |
| 25 | AC-4 | 55.0 | 4.5 | 41.5 | 3.5 | 0.15 | 79 | 71 | 44 |
| 26 | AC-4 | 55.0 | 4.5 | 41.5 | 3.5 | 0.20 | 71 | 71 | 37 |
| 27 | AC-4 | 60.0 | 4.5 | 36.5 | 3.5 | 0.15 | 61 | 59 | 34 |

Examples 23, 25, and 27 illustrate the effect of decreasing the amount of tackifiers relative to the amount of acrylic copolymer in the adhesive. As the total amount of tackifier decreases from 50 wt. % (EX-23), to 45 wt. % (EX-25), and further to 40 wt. % (EX-27), the peel adhesion to both the high surface energy stainless steel panel, and the low surface energy polypropylene and HDPE panels decreased.

Examples 24, 25, and 26 illustrate the effect of increasing the amount of crosslinker. While an increase in crosslinker level decreased the adhesion to all substrates, the effect appears to be greater for adhesion to the low surface energy substrates.

As summarized in Table 6A and 6B, the adhesive of Example 24 provides excellent adhesion to low surface energy substrates, good adhesion to variety of other substrates, and adequate cohesive strength as compared to a variety of commercial available products.

TABLE 6A

Comparison of Example 24 to commercially available adhesives.

| | | | Thickness | 90° Peel adhesion (N/dm) | | |
| Ex. | Adhesive | Source | (microns) | SS | PP | HDPE |
|---|---|---|---|---|---|---|
| CE-5 | 300MP | 3M Co. | 51 | 59 | 26 | 18 |
| CE-6 | #350 | 3M Co. | 51 | 72 | 26 | 25 |
| CE-7 | 300LSE | 3M Co. | 51 | 83 | 41 | 39 |
| CE-8 (a) | #4965 | Tesa | 89 (×2) | 87 | 52 | 38 |
| EX-24 | — | — | 51 | 97 | 100 | 65 |

TABLE 6B

Comparison of Example 24 to commercially available adhesives (continued).

| | | | | 90° Peel adhesion (N/dm) | | | 70° C. Shear |
| Ex. | Adhesive | Source | Thickness (microns) | PMMA | PC | ABS | (min.) SS |
|---|---|---|---|---|---|---|---|
| CE-5 | 300MP | 3M Co. | 51 | 56 | 54 | 52 | 66 |
| CE-6 | #350 | 3M Co. | 51 | 76 | 42 | 69 | 7219 |

TABLE 6B-continued

Comparison of Example 24 to commercially available adhesives (continued).

| Ex. | Adhesive | Source | Thickness (microns) | 90° Peel adhesion (N/dm) PMMA | PC | ABS | 70° C. Shear (min.) SS |
|---|---|---|---|---|---|---|---|
| CE-7 | 300LSE | 3M Co. | 51 | 106 | 90 | 66 | 7088 |
| CE-8 (a) | #4965 | TESA | 89 (×2) | 106 | 106 | 119 | 10000 |
| EX-24 | — | — | 51 | 102 | 100 | 90 | 10000 |

(a) Comparative Example C8 is a double coated tape having 89 microns of adhesive on both sides of a carrier.

Probe Testing. Probe tests of adhesive samples were performed with a TA.XT PLUS TEXTURE ANALYZER (Stable Micro Systems Ltd., UK) under ambient conditions. A cylindrical high-density polyethylene probe with a diameter of 5.0 mm was brought into contact with a 102 micron (4 mil) thick adhesive layer on a glass slide under a contact force of 500 grams for 60 seconds. Then the probe was pulled away with a constant velocity of 0.05 mm per second until completely debonded. The force applied to the probe was recorded as a function of the probe displacement distance. The strength of the adhesive joint is given by the rupture energy, which was calculated as an integration of the force against displacement during the debonding process, i.e., the area under the force-displacement curve. The results are summarized in Table 7.

TABLE 7

Probe Test results.

| I.D. | wt. % tackifiers | wt. % bisamide | Maximum Force (N) | Maximum Displacement (mm) | Rupture Energy (N · mm) |
|---|---|---|---|---|---|
| EX-27 | 40 | 0.15 | 7.8 | 0.61 | 2.10 |
| EX-25 | 45 | 0.15 | 9.1 | 0.70 | 3.01 |
| EX-23 | 50 | 0.15 | 9.3 | 0.77 | 3.84 |
| EX-24 | 45 | 0.10 | 8.1 | 1.13 | 5.03 |
| EX-26 | 45 | 0.20 | 8.8 | 0.54 | 2.14 |

Compared to typical acrylic adhesives, in some embodiments, the adhesives of the present disclosure exhibit strain-hardening behavior, i.e., the tensile force needed to separate the adhesive joint goes up as the strain on the adhesive increases. As a result, the adhesive strength (e.g., the area under the force-displacement curve) is significantly greater. Also, as the total combined amount of the high Tg and low Tg tackifiers increases from 40 wt. % (EX-27), to 45 wt. % (EX-25), and further to 50 wt. % (EX-23), both the maximum force and the maximum displacement at the point of final joint rupture increase. Thus, the area under the force-displacement curve is increased, indicating a stronger adhesive joint.

Adhesive samples were prepared according to the compositions set forth in Table 8 using the method described above. All samples contained 0.10 weight percent bisamide crosslinker based on the weight of the acrylic copolymer. As shown in Table 8, increasing the amount of high Tg tackifier from 0 to 40% by weight led to increased adhesion to stainless steel and polypropylene (CE-9 to CE-11). However, further increasing the amount of high Tg tackifier to 50 wt. % and 60 wt. % resulted in a decrease in both the adhesion to the low surface energy polypropylene substrate and the shear strength (CE-12 and CE-13). Significantly better adhesion to polypropylene was achieved using a combination of high and low Tg tackifiers (Examples EX-28 and EX-29) rather than a single high Tg tackifier at comparable or even higher total tackifier loadings (CE-12 and CE-13). Thus, merely increasing the amount of a single high Tg tackifier in an adhesive is not as effective as combining a high Tg tackifier and a low Tg tackifier to achieve adhesives according to the present disclosure.

TABLE 8

Effects of including a low Tg tackifier.

| | Weight % in the adhesive | | | 90° peel (N/dm) | | 70° C. Shear (min.) | Tg (K) | |
|---|---|---|---|---|---|---|---|---|
| | | FORAL | | | | | | |
| Ex. | Acrylic polymer | 85LB high Tg | ES2520 low Tg | SS | PP | SS | Fox (c) | DSC (d) |
| CE-9 | 100 | 0 | 0 | 36 | 14 | 10000+ | 224 | 224 |
| CE-10 | 70 | 30 | 0 | 67 | 43 | 10000+ | 245 | 242 |
| CE-11 | 60 | 40 | 0 | 91 | 62 | 10000+ | 253 | 247 |
| CE-12 | 50 | 50 | 0 | 131 | 52 | 10000+/(b) | 261 | 253 |
| CE-13 | 40 | 60 | 0 | 74 | 46 | 300 | 270 | 261 |
| EX-28 | 50 | 45 | 5 | 122 | 106 | 10000+ | 259 | 252 |
| EX-29 | 50 | 40 | 10 | 117 | 113 | 10000+ | 256 | 250 |

(b) Two samples held for 10,000+ minutes, one sample failed at 4312 minutes.
(c) Glass transition temperature as calculated using the Fox Equation.
(d) Glass transition temperature as measured by differential scanning calorimetry.

The effect of filler concentration was evaluated by adding various amounts of fumed silica (AEROSIL R972V obtained from Degussa Corp., "R972V") to an adhesive system comprising an acrylic copolymer (AC-4), a high Tg tackifier (FORAL 85LB), a low Tg tackifier (ES2520), and 0.1 wt. % of bisamide crosslinker. The amount of filler is reported in parts by weight per hundred parts of adhesive (i.e., per 100 parts of combined acrylic copolymer and total tackifier). The adhesive samples were prepared according to the method described above, except the samples were coated on the HOSTAPHAN W270 with opaque polyester backing. The 180° peel from polypropylene and the 70° C. shear from stainless steel were tested and the results are reported in Table 9. "Cohesive" indicates cohesive failure of the adhesive layer. "Clean" indicate clean removal of the adhesive from the panel.

TABLE 9

Effect of filler loading on adhesive performance.

| | Weight % in the adhesive | | | pph | 180° peel from PP | | 70° C. Shear |
|---|---|---|---|---|---|---|---|
| Ex. | Acrylic polymer | high Tg tackifier | low Tg tackifier | adhesive R972V | N/dm | failure mode | SS (min.) |
| EX-30 | 52.5 | 42 | 5.5 | 0.0 | 123 | Cohesive | 300 |
| EX-31 | 52.5 | 42 | 5.5 | 2.5 | 91 | Clean | 10000+ |
| EX-32 | 52.5 | 42 | 5.5 | 5.0 | 86 | Clean | 10000+ |

Additional examples were prepared to compare the performance of adhesives comprising both a high Tg and a low Tg tackifier, to similar adhesives comprising a high Tg tackifier and a plasticizer. The adhesives were prepared as described above except the adhesives were coated on a 51 micron (2 mil) white opaque polyester film backing (HOSTAPHAN W270 available from Mitsubishi Polyester Film, Inc.). Under the heading for compatibility (Compat.), "Good" indicates a clear adhesive film, "Fair" indicates a slightly haze film, and "Poor" indicates a haze film.

TABLE 10

Tg tackifier-containing adhesives compared to plasticizer-containing adhesives.

| | Weight % in the adhesive | | | Low Tg tackifier/plasticizer | | | 180° peel (24 hr.) PP |
|---|---|---|---|---|---|---|---|
| Ex. | Acrylic polymer | FORAL 85LB high Tg | low Tg material | type | I.D. | Comp. | (N/dm) |
| EX-33 | 52.5 | 40.0 | 7.5 | tackifier | SYL. A-25 | Fair | 104 |
| EX-34 | 52.5 | 40.0 | 7.5 | tackifier | ES 2520 | Good | 121 |
| EX-35 | 52.5 | 40.0 | 7.5 | tackifier | ESTER 3E | Good | 116 |
| CE-14 | 52.5 | 40.0 | 7.5 | plasticizer | PYCAL 94 | Good | 84 |
| CE-15 | 52.5 | 40.0 | 7.5 | plasticizer | G1000 | Poor | 76 |

Generally, adhesives according to the present disclosure may be used in any typical adhesive applications. In some embodiments, the adhesive may be used as a free (i.e., unsupported) adhesive film. In some embodiments, adhesive articles such as tapes may be useful. In some embodiments, the adhesive may be bonded to a substrate, e.g., a paper, a polymeric film, a scrim, a foil, and the like. In some embodiments, the adhesive may be directly bonded to the substrate. In some embodiments, the adhesive may be indirectly bonded to the substrate, i.e., there are one or more intervening layers (e.g., primer layers) between the adhesive and the substrate.

In some embodiments, the adhesive or adhesive articles may be used to bond two substrates together. For example, a layer of adhesive may be used to bond a first substrate to a second substrate. In some embodiments, at least one of the substrates is a low surface energy substrate, i.e., a substrate having a surface energy of less than 40 millinewtons per meter (mN/m), e.g., less than 35 mN/m. Exemplary low surface energy materials include polyolefins such as polypropylene and polyethylene (e.g., high density polyethylene).

Figure 1:
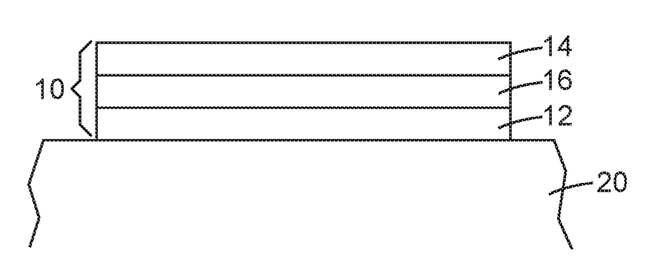
FIG. 1 illustrates an exemplary adhesive article according to some embodiments of the present disclosure.

Exemplary adhesive article 10 according to some embodiments of the present disclosure is illustrated in FIG. 1. Adhesive article 10 comprises adhesive 12 bonded to first substrate 14. Adhesive 12 is indirectly bonded to first substrate 14, as optional primer layer 16 is interposed between adhesive 12 and first substrate 14. As shown in FIG. 1, adhesive article 10 is bonded to second substrate 20, which may be a low surface energy substrate.

Various modifications and alterations of this invention will become apparent to those skilled in the art without departing from the scope and spirit of this invention.

What is claimed is:

1. An adhesive comprising:
   a) an acrylic copolymer comprising the reaction product of
      i) a first alkyl (meth)acrylate, wherein the alkyl group of the first alkyl (meth)acrylate comprises at least 5 carbon atoms;
      ii) a second alkyl(meth)acrylate, wherein the alkyl group of the second alkyl (meth)acrylate comprises 1 to 4 carbon atoms; and
      iii) a vinyl carboxylic acid; and
   b) a high Tg tackifier having a glass transition temperature of at least 20° C.; and
   c) a low Tg tackifier having a glass transition temperature of no greater than 0° C.,
   wherein the glass transition temperatures of the high Tg tackifier and the low Tg tackifier are greater than the glass transition temperature of the acrylic copolymer,
   wherein the weight ratio of the first alkyl (meth)acrylate to the second alkyl (meth)acrylate is between 3:1 and 1:3, and the acrylic copolymer comprises at least 3% by weight and no greater than 8% by weight of the vinyl carboxylic acid; and wherein the adhesive comprises 35 to 45% by weight of the high Tg tackifier and 2 to 13% by weight of the low Tg tackifier, based on the total weight of the acrylic copolymer, the high Tg tackifier and the low Tg tackifier.

2. The adhesive according to claim 1, wherein the adhesive comprises 40 to 55% by weight total tackifier content based on the total weight of the acrylic copolymer, the high Tg tackifier and the low Tg tackifier.

3. The adhesive according to claim 1, further comprising a crosslinker.

4. The adhesive of claim 3, wherein the crosslinker is a covalent crosslinker selected from the group consisting of bisamides, epoxies, and melamines.

5. The adhesive of claim 3, wherein the crosslinker is an ionic crosslinking agent, wherein the ionic crosslinking agent is selected from the group consisting of multifunctional amines, metal oxides, and organo-metallic chelating agents.

6. The adhesive according to claim 1, further comprising an additional component selected from the group consisting of fillers, dyes, pigments, antioxidants, UV-stabilizers.

7. The adhesive according to claim 6, wherein the fillers are fumed silica.

8. The adhesive according to claim 6, wherein the fillers are nanoparticles.

9. The adhesive according to claim 8, wherein the nanoparticles are surface-modified nanoparticles.

10. The adhesive according to claim 1, wherein the glass transition temperature of the adhesive is no greater than 260 K, as calculated using the Fox Equation.

11. An adhesive article comprising a first substrate and an adhesive according to claim 1 bonded to the substrate.

12. The adhesive article of claim 11, wherein the adhesive is directly bonded to the first substrate.

13. The adhesive article of claim 11, wherein the adhesive is bonded to a second substrate.

14. The adhesive article of claim 13, wherein at least one of the first substrate and the second substrate is a low surface energy substrate having a surface energy of no greater than 35 millinewtons per meter.

* * * * *

UNITED STATES PATENT AND TRADEMARK OFFICE
CERTIFICATE OF CORRECTION

PATENT NO. : 9,574,117 B2  
APPLICATION NO. : 14/979713  
DATED : February 21, 2017  
INVENTOR(S) : Jingjing Ma et al.

It is certified that error appears in the above-identified patent and that said Letters Patent is hereby corrected as shown below:

In the Specification

Column 1  
Line 25, delete "acid; and" and insert -- acid. --, therefor.

Column 4  
Line 36 (approx.), delete "wt %" and insert -- wt. % --, therefor.

Signed and Sealed this  
Twenty-eighth Day of November, 2017

Joseph Matal  
*Performing the Functions and Duties of the*  
*Under Secretary of Commerce for Intellectual Property and*  
*Director of the United States Patent and Trademark Office*